US012683483B2

(12) United States Patent
Kim et al.

(10) Patent No.: US 12,683,483 B2
(45) Date of Patent: Jul. 14, 2026

(54) GATE DRIVING DEVICE AND METHOD OF CONTROLLING ELECTRIFIED VEHICLE INCLUDING SAME

(71) Applicants: Hyundai Motor Company, Seoul (KR); Kia Corporation, Seoul (KR)

(72) Inventors: Myung Ho Kim, Incheon (KR); Young Seul Lim, Seoul (KR); Ki Jong Lee, Hwaseong-si (KR); Kang Ho Jeong, Siheung-si (KR)

(73) Assignees: CORPORATION MOTOR, Seoul (KR); KIA CORPORATION, Seoul (KR)

( * ) Notice: Subject to any disclaimer, the term of this patent is extended or adjusted under 35 U.S.C. 154(b) by 343 days.

(21) Appl. No.: 18/372,865

(22) Filed: Sep. 26, 2023

(65) Prior Publication Data

US 2024/0305183 A1 Sep. 12, 2024

(30) Foreign Application Priority Data

Mar. 6, 2023 (KR) ........................ 10-2023-0029366

(51) Int. Cl.
| | |
|---|---|
| *B60L 3/00* | (2019.01) |
| *B60L 53/22* | (2019.01) |
| *H02J 7/96* | (2026.01) |
| *H02M 1/08* | (2006.01) |
| *H02P 27/06* | (2006.01) |
| *H02M 3/335* | (2006.01) |

(52) U.S. Cl.
CPC .............. *H02M 1/08* (2013.01); *B60L 53/22* (2019.02); *H02J 7/96* (2026.01); *H02P 27/06* (2013.01); *B60L 2210/14* (2013.01); *H02M 3/33523* (2013.01)

(58) Field of Classification Search
CPC ......... H02M 1/08; H02M 7/797; B60L 53/22; B60L 2210/14; B60L 3/003; H02J 7/007182; H02K 3/28
See application file for complete search history.

(56) References Cited

U.S. PATENT DOCUMENTS

| | | | | |
|---|---|---|---|---|
| 2004/0062059 A1* | 4/2004 | Cheng | .................. | H02M 7/797 363/17 |
| 2018/0241337 A1* | 8/2018 | Zou | ......................... | B60L 3/003 |
| 2019/0061537 A1* | 2/2019 | Ge | ........................... | H02K 3/28 |

FOREIGN PATENT DOCUMENTS

| | | |
|---|---|---|
| JP | 5598562 B2 | 10/2014 |
| JP | 2018-137975 A | 8/2018 |
| KR | 10-2022-0146941 A | 11/2022 |

* cited by examiner

*Primary Examiner* — Cortez M Cook

(74) *Attorney, Agent, or Firm* — Morgan, Lewis & Bockius LLP

(57) ABSTRACT

A gate driving device includes a power supply circuit configured to boost a power source voltage and to output a first driving power voltage and a second driving power voltage, and a gate driver configured to drive a top control signal for switching a top switch element of an inverter by receiving the first driving power voltage from the power supply circuit, to drive a bottom control signal for switching a bottom switch element of the inverter by receiving the second driving power voltage from the power supply circuit, and to output a charging control signal for switching a charging switch element connected to a neutral terminal of a motor and one end of the bottom switch element by receiving the second driving power voltage.

16 Claims, 4 Drawing Sheets

200

GATE DRIVING DEVICE AND METHOD OF CONTROLLING ELECTRIFIED VEHICLE INCLUDING SAME

CROSS-REFERENCE TO RELATED APPLICATION

The present application claims priority to Korean Patent Application No. 10-2023-0029366, filed on Mar. 6, 2023, the entire contents of which is incorporated herein for all purposes by this reference.

BACKGROUND OF THE PRESENT DISCLOSURE

Field of the Present Disclosure

The present disclosure relates to a gate driving device for driving a control signal applied to switch elements of an inverter and a method of controlling an electrified vehicle including the same.

Description of Related Art

Electrified vehicles include an inverter including a plurality of switch elements to drive a motor, and a motor controller can drive the inverter through a gate driving device.

The gate driving device may include a gate driver that applies a control signal to a gate terminal of a switch element and a power supply circuit for supplying power applied to the gate driver.

The power supply circuit can boost a low power voltage (e.g., a voltage of an auxiliary battery) to generate a high driving power voltage and supply this driving power voltage to the gate driver. In the instant case, the power supply circuit may include a transformer that electrically insulates the power supply side to which the low voltage is applied from the inverter side to which the high voltage is applied.

In general, a power supply circuit can use a transformer including a single primary coil to which a power voltage is applied and a plurality of secondary coils corresponding to switch elements included in an inverter. However, the present scheme reduces the flexibility of circuit design of a gate driving device, increasing an area required for the gate driving device, and requires a large core for the transformer, which may increase EMI noise emission during switching.

To solve the present problem, a separated power supply structure in which a plurality of power supply circuits is disposed corresponding to a plurality of gate drivers of an inverter may be applied to a gate driving device. However, in the separated power supply structure, as the number of switch elements to be controlled by the gate driving device increases, the area and elements required for the gate driving device may increase.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to reduce the area and the number of elements required for a gate driving apparatus and improve design flexibility of the gate driving apparatus by sharing a power supply circuit of the gate driving apparatus for switch elements including the same gate potential in a motor driving device.

The technical issues to be achieved in an exemplary embodiment of the present disclosure are not limited to the technical issues mentioned above, and other technical issues which are not mentioned will be clearly understood by those of ordinary skill in the art to which the present disclosure belongs from the description below.

In accordance with an aspect of the present disclosure, the above and other objects may be accomplished by the provision of a gate driving apparatus including a power supply circuit configured to boost a power source voltage and to output a first driving power voltage and a second driving power voltage, and a gate driver configured to drive a top control signal for switching a top switch element of an inverter by receiving the first driving power voltage from the power supply circuit, to drive a bottom control signal for switching a bottom switch element of the inverter by receiving the second driving power voltage from the power supply circuit, and to output a charging control signal for switching a charging switch element connected to a neutral terminal of a motor and one end of the bottom switch element by receiving the second driving power voltage.

In accordance with another aspect of the present disclosure, there is provided a gate driving apparatus including a plurality of power supply circuits boosting a power source voltage and outputting each of a first driving power voltage and a second driving power voltage, and a plurality of gate drivers configured to receive the first driving power voltage and the second driving power voltage, corresponding to each of the power supply circuits, to drive a top control signal for switching one of a plurality of top switch elements included in an inverter based on the first driving power voltage, and to drive a bottom control signal for switching one of a plurality of bottom switch elements included in the inverter based on the second driving power voltage, wherein at least one of the plurality of gate drivers drive a charging control signal for switching a charging switch element connected to a neutral terminal of a motor and one end of the plurality of bottom switch elements by receiving the second driving power voltage.

In accordance with another aspect of the present disclosure, there is provided a method of controlling an electrified vehicle, including a power supply circuit boosting a power source voltage and outputting a first driving power voltage and a second driving power voltage to a gate driver, the gate driver driving a motor by switching a top switch element of an inverter based on the first driving power voltage and switching a bottom switch element of the inverter based on the second driving power voltage, and the gate driver turning on a charging switch element connected to a neutral terminal of the motor and one end of the bottom switch element to charge a battery based on the second driving power voltage.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
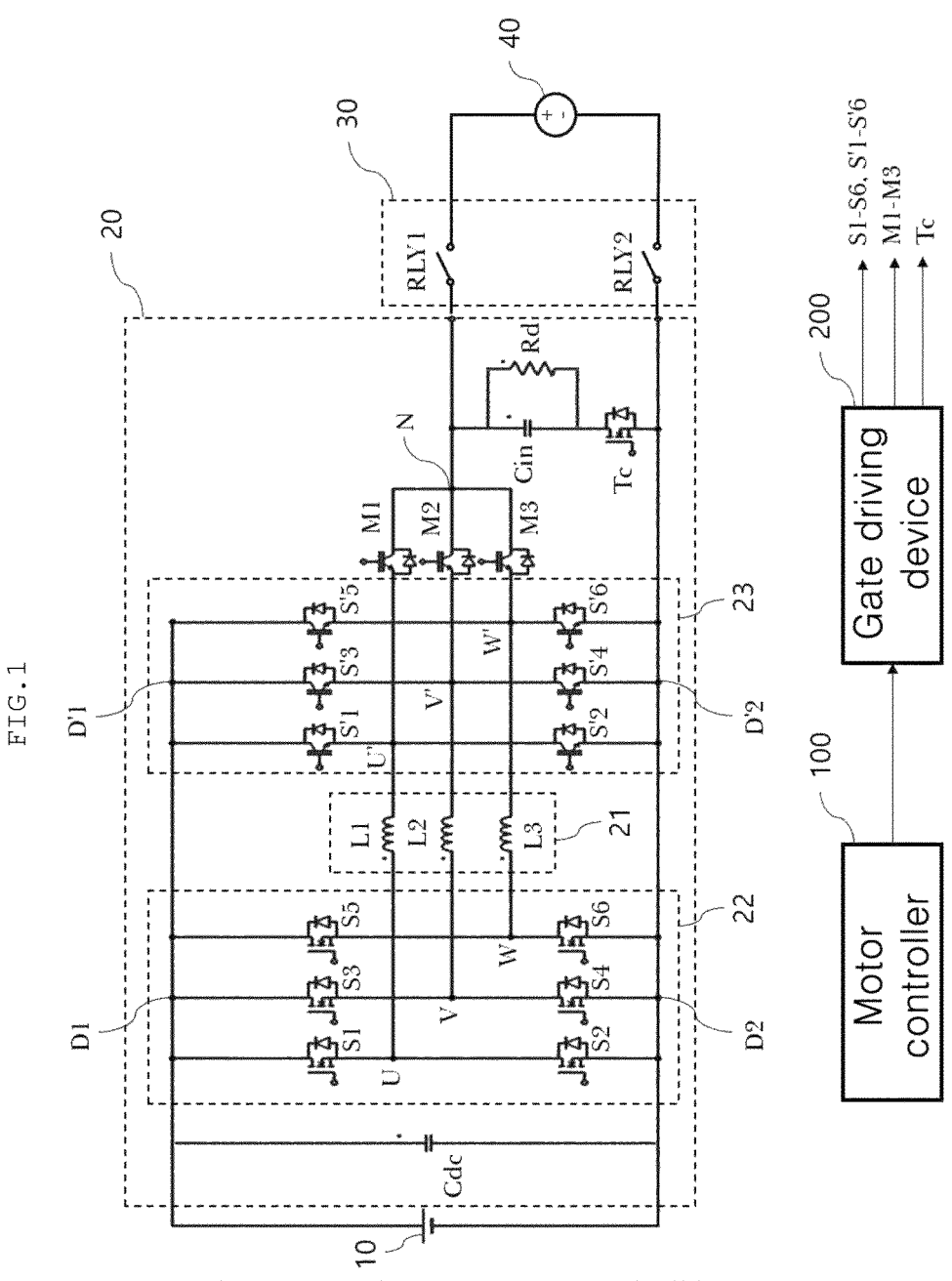
FIG. 1 is a diagram showing a motor driving system of an electrified vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments included in the present specification will be described in detail with reference to the accompanying drawings, but the same or similar components are denoted by the same reference numerals and redundant descriptions thereof will be omitted. The suffixes "module" and "part" of elements herein are used for convenience of description and thus may be used interchangeably and do not have any distinguishable meanings or functions. In the following description of the exemplary embodiments included in the present specification, a detailed description of known functions and configurations incorporated herein will be omitted when it may obscure the subject matter of the present disclosure. Furthermore, the accompanying drawings are provided only for ease of understanding of the exemplary embodiments included in the present specification, do not limit the technical spirit included herein, and include all changes, equivalents and substitutes included in the spirit and scope of the present disclosure.

The terms "first" and/or "second" are used to describe various components, but such components are not limited by these terms. The terms are used to discriminate one component from another component.

When a component is "coupled" or "connected" to another component, it should be understood that a third component may be present between the two components although the component may be directly coupled or connected to the other component. When a component is "directly coupled" or "directly connected" to another component, it should be understood that no element is present between the two components.

An element described in the singular form is intended to include a plurality of elements unless the context clearly indicates otherwise.

In the present specification, it will be further understood that the term "comprise" or "include" specifies the presence of a stated feature, figure, step, operation, component, portion or combination thereof, but does not preclude the presence or addition of one or more other features, figures, steps, operations, components, or combinations thereof.

Furthermore, a unit or a control unit included in the names of a motor control unit (MCU), a hybrid control unit (HCU), and the like is only a term widely used to name a controller that is configured to control a specific vehicle function and does not mean a generic functional unit. For example, each controller may include a communication device that communicates with other controllers or sensors to control functions of the controller, a memory that stores an operating system or logic commands and input/output information, and one or more processors that perform determination, operation, and decision necessary to control the functions.

FIG. 1 is a diagram showing a motor driving system of an electrified vehicle according to an exemplary embodiment of the present disclosure.

As shown in FIG. 1, an electrified vehicle may include a battery 10, a motor driving device 20, a junction block 30, a motor controller 100, and a gate driving device 200.

The battery 10 may include a positive terminal (+) and a negative terminal (−).

The motor driving device 20 may include a motor 21, a first inverter 22, a second inverter 23, a plurality of transfer switch elements M1 to M3, a DC capacitor Cdc, a charging switch element Tc, an input capacitor Cin, and a radiation resistor Rd. At the time of driving the motor 21, the motor driving device 20 according to the exemplary embodiment may transform the voltage of the battery 10 into an AC voltage using at least one of the first inverter 22 and the second inverter 23, and provide the AC voltage to the motor 21, and when the battery 10 is rapidly charged, charge the battery 10 using an external DC voltage 40 through at least one of the first inverter 22 or the second inverter 23. Although the motor driving device 20 shown in FIG. 1 includes the two inverters 22 and 23, the motor driving device 20 may include only one inverter according to an exemplary embodiment of the present disclosure. Furthermore, each of the switch elements included in the motor driving device 20 may be implemented as either an insulated gate bipolar mode transistor (IGBT) or a metal-oxide-semiconductor field-effect transistor (MOSFET).

The motor 21 may include a plurality of windings L1, L2, and L3 corresponding to a plurality of phases.

The first inverter 22 may have AC links U, V, and W corresponding to the plurality of phases, a DC link D1 connected to the positive terminal (+) of the battery 10, and a DC link D2 connected to the negative terminal (−) of the battery 10 and may include a plurality of legs S1-S2, S3-S4, and S5-S6 respectively connected to one end of the plurality of windings L1, L2, and L3 to correspond to the AC links U, V, and W. The plurality of legs S1-S2, S3-S4, and S5-S6 may include top switch element S1, S3, and S5 and bottom switch elements S2, S4, and S6. The top switch elements S1, S3, and S5 may be connected between the DC link D1 and the plurality of windings L1, L2, and L3, and the bottom-switch elements S2, S4, and S6 may be connected between the DC link D2 and the plurality of windings L1, L2, and L3. In the instant case, the DC capacitor Cdc may be connected between the DC links D1 and D2.

The second inverter 23 may have AC links U', V', and W' corresponding to the plurality of phases and DC links D'1 and D'2 connected to the DC links D1 and D2 of the first inverter 22 and may include a plurality of legs S'1-S'2, S'3-S'4, and S'5-S'6 respectively connected to the other ends of the plurality of windings L1, L2, and L3 to correspond to the AC links U', V', and W'. The plurality of legs S'1-S'2, S'3-S'4, and S'5-S'6 may include top switch elements S'1, S'3, and S'5 and bottom switch elements S'2, S'4, and S'6. The top switch elements S'1, S'3, and S'5 may be connected between the DC link D'1 and the plurality of windings L1, L2, and L3, and the bottom switch elements S'2, S'4, and S'6 may be connected between the DC link D'2 and the plurality of windings L1, L2, and L3.

One end of the plurality of transfer switch elements M1-M3 is connected to a neutral terminal N of the plurality of windings L1, L2, and L3, and the other ends of the plurality of transfer switch elements M1 to M3 are connected to the other ends of the plurality of windings L1, L2, and L3.

The turn-on state of the plurality of transfer switch elements M1 to M3 may be controlled by the motor controller 100 according to a motor driving mode. Motor driving modes may include a closed end winding mode (CEW mode) and an open end winding mode (OEW mode).

The CEW mode is a mode in which the other ends of the plurality of windings L1, L2, and L3 included in the motor 21 are electrically connected to the neutral terminal N, and the motor 21 is efficiently driven only through the first inverter 22 in a low power section. On the other hand, the OEW mode is a mode in which the other ends of the plurality of windings L1, L2, and L3 included in the motor 21 are electrically separated from the neutral terminal N, and the driving force of the motor 21 is increased through the second inverter 23 as well as the first inverter 22 in a high power section.

When the motor driving mode is set to the CEW mode, the motor controller 100 can turn on the plurality of transfer switch elements M1-M3 to form a neutral point of the plurality of windings L1, L2, and L3, switch the plurality of legs S1-S2, S3-S4, and S5-S6 included in the first inverter 22, and control the switch elements S'1 to S'6 included in the second inverter 23 to be in a non-conductive state. When the motor driving mode is set to the OEW mode, the motor controller 100 can turn off the plurality of transfer switch elements M1 to M3 so that the plurality of windings L1, L2, and L3 do not form a neutral point and switch the plurality of legs S'1-S'2, S'3-S'4, and S'5-S'6 included in the second inverter 23 as well as the plurality of legs S1-S2, S3-S4, and S5-S6) included in the first inverter 22. In an exemplary embodiment of the present disclosure, switching a leg may be understood as complementarily switching a top switch element and a bottom switch element included in the leg.

The input capacitor Cin may be electrically connected to the neutral terminal N of the motor 21 to reduce ripples of the external DC voltage 40 as the charging switch element Tc is turned on when the battery 10 is rapidly charged. On the other hand, when the motor 21 is driven, the input capacitor Cin may be electrically separated from the neutral terminal N of the motor 21 as the charging switch element Tc is turned off. The charging switch element Tc and the input capacitor Cin may be connected in series between the neutral terminal N of the motor 21 and the negative terminal (−) of the battery 10, and the radiation resistor Rd may be connected in parallel with the input capacitor Cin.

The junction block 30 may include a first charging relay RLY1 connected between the neutral terminal N and the positive polarity (+) of the external DC voltage 40 and a second charging relay RLY2 connected between the negative terminal (−) of the battery 10 and the negative polarity (−) of the external DC voltage 40.

The motor controller 100 may be configured for controlling the turn-on state of the switch elements S1 to S6, S'1 to S'6, M1 to M3, and Tc included in the motor driving device 20 through the gate driving device 200.

The gate driving device 200 may include a gate driver for applying control signals to gate terminals of the switch elements S1 to S6, S'1 to S'6, M1 to M3, and Tc and a power supply circuit for supplying power applied to the gate driver.

To the present end, a method of providing a power supply circuit for each control signal applied to the gate terminals of the switch elements S1 to S6, S'1 to S'6, M1 to M3, and Tc may be conceived. However, the present method may not only increase the area of the gate driving device 200 but also reduce design flexibility of the gate driving device 200.

Therefore, there is a need for a method of reducing the area and the number of elements required for the gate driving device 200 and improving design flexibility of the driving device 200 by sharing a power supply circuit of the gate driving device 200 for switch elements including the same gate potential in the motor driving device 20. Here, a gate potential may correspond to a potential difference between a gate terminal and a source terminal (or emitter terminal) of a switch element.

Accordingly, the exemplary embodiment proposes a gate driving device 200 sharing a power supply circuit for one of the bottom switch elements S2, S4, S6, S'2, S'4, and S'6 including the same gate potential and the charging switch element Tc. Furthermore, the exemplary embodiment proposes a gate driving device 200 sharing a power supply circuit for the plurality of top switch elements S'1, S'3, and S'5 including the same gate potential and the transfer switch elements M1, M2, and M3. A structure for this is shown in FIG. 2.

Figure 2:
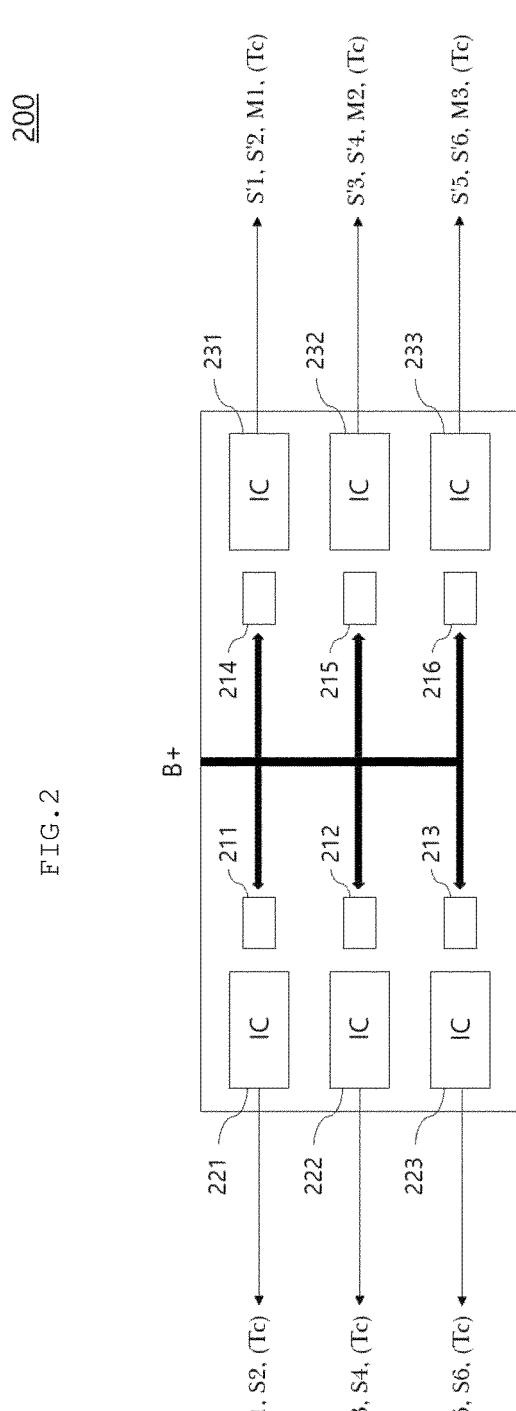
FIG. 2 is a diagram showing a configuration of a gate driving device according to an exemplary embodiment of the present disclosure.

FIG. 2 is a diagram showing a configuration of a gate driving device according to an exemplary embodiment of the present disclosure.

As shown in FIG. 2, the gate driving device 200 according to an exemplary embodiment of the present disclosure may include a plurality of power supply circuits 211, 212, 213, 214, 215 and 216, a plurality of first gate drivers 221, 222 and 223, and a plurality of second gate drivers 231, 232 and 233.

In an exemplary embodiment of the present disclosure, the gate driving device 200 may be implemented in a form of a board, and the plurality of power supply circuits 211, 212, 213, 214, 215 and 216, the plurality of first gate drivers 221, 222 and 223, and the plurality of second gate drivers 231, 232 and 233 may be disposed on one surface of the board. Although the plurality of first gate drivers 221, 222 and 223 and the plurality of second gate drivers 231, 232 and 233 are respectively disposed on one side and the other side of the board facing each other in FIG. 2, the present disclosure is not necessarily limited thereto. The gate driving device 200 may be electrically connected to gate terminals of the switch elements S1 to S6, S'1 to S'6, M1 to M3, and Tc included in the motor driving device (20 in FIG. 1).

The plurality of power supply circuits 211, 212, 213, 214, 215 and 216 may boost a power source voltage B+ and output a first driving power voltage and a second driving power voltage. In the instant case, the power source voltage B+ may be applied from an auxiliary battery, but the present disclosure is not necessarily limited thereto. In an exemplary embodiment of the present disclosure, the first driving power voltage may correspond to a power source voltage for the gate driver to apply a control signal to a gate terminal of a top switch element, and the second driving power voltage may correspond to a power source voltage for a gate driver to apply a control signal to the gate terminal of a bottom switch element. The plurality of power supply circuits 211, 212, 213, 214, 215 and 216 may include the same configuration.

The plurality of first gate drivers 221, 222 and 223 may respectively correspond to the power supply circuits 211, 212 and 213 to receive the first driving power voltage and the second driving power voltage. The plurality of first gate drivers 221, 222 and 223 may output a top control signal for switching one of the plurality of top switch elements S1, S3, and S5 included in the first inverter (22 in FIG. 1) based on the first driving power voltage, and output a bottom control signal for switching one of the plurality of bottom switch elements S2, S4, and S6 included in the first inverter (22 in FIG. 1) based on the second driving power voltage.

The plurality of second gate drivers 231, 232 and 233 may respectively correspond to the plurality of power supply circuits 214 to 216 to receive the first driving power voltage and the second driving power voltage. The plurality of second gate drivers 231, 232 and 233 may output a top control signal for switching one of the plurality of top switch elements S'1, S'3, and S'5 included in the second inverter (23 in FIG. 1) based on the first driving power voltage, and output a bottom control signal for switching one of the plurality of bottom switch elements S'2, S'4, and S'6 included in the second inverter (23 in FIG. 1) based on the second driving power voltage.

When the motor is driven, the plurality of first and second gate drivers 221, 222 and 223 and 231, 232 and 233 may complementarily activate the top control signal and the bottom control signal so that the top switch element and the bottom switch element are complementarily switched based on required power for the motor applied from the motor controller (100 in FIG. 1).

In an exemplary embodiment of the present disclosure, one of the plurality of first and second gate drivers 221, 222 and 223 and 231, 232 and 233 may receive the second driving power voltage, and output a charging control signal for switching the charging switch element Tc connected between the neutral terminal N of the motor and one end of the plurality of bottom switch elements S2, S4, S6, S'2, S'4, and S'6 (that is, the negative terminal of the battery). For example, the power supply circuit 211 may boost the power source voltage B+ and output the first driving power voltage and the second driving power voltage, and the first gate driver 221 may receive the first driving power voltage and the second driving power voltage from the power supply circuit 211. Thereafter, the first gate driver 221 may receive the first driving power voltage to output a top control signal for switching the top switch element S1 and receive the second driving power voltage to output a bottom control signal for switching the bottom switch element S2. Furthermore, the first gate driver 221 may output the charging control signal for switching the charging switch element Tc based on the second driving power voltage for the bottom switch element S2. In the instant case, the first gate driver 221 may deactivate the charging control signal to turn off the charging switch element Tc when the motor is driven and activate the charging control signal to turn on the charging switch element Tc when the battery is rapidly charged.

Accordingly, the power supply circuit for the bottom switch element S2 and the charging switch element Tc including the same gate potential may be shared. Meanwhile, since a large current flows through the bottom switch elements S2, S4, S6, S'2, S'4, and S'6, current distortion and voltage drop may occur due to parasitic components when the bottom switch elements share a power supply circuit. On the other hand, a small ripple current flows through the charging switch element Tc even if the charging switch element Tc is turned on during rapid charging, the charging switch element Tc can operate normally regardless of parasitic components when sharing a power supply circuit with one bottom switch element.

Furthermore, the plurality of second gate drivers 231, 232 and 233 may output a mode switching control signal for switching the transfer switches M1, M2, and M3 connected between the neutral terminal and one end of the plurality of top switch elements S'1, S'3, and S'5 based on the first driving power voltage. For example, the power supply circuit 214 boosts the power source voltage B+ and output the first drive power voltage and the second drive power voltage, and the second gate driver 231 may receive the first driving power voltage and the second driving power voltage from the power supply circuit 214. Thereafter, the second gate driver 231 may receive the first driving power voltage to output a top control signal for switching the top switch element S'1, and receive the second driving power voltage to output a bottom control signal for switching the bottom switch element S'2. Furthermore, the second gate driver 231 may output a mode switching control signal for the transfer switch element M1 based on the first driving power voltage for the top switch element S'1. Accordingly, the power supply circuit for the top switch element S'1 and the transfer switch element M1 including the same gate potential may be shared.

Figure 3:
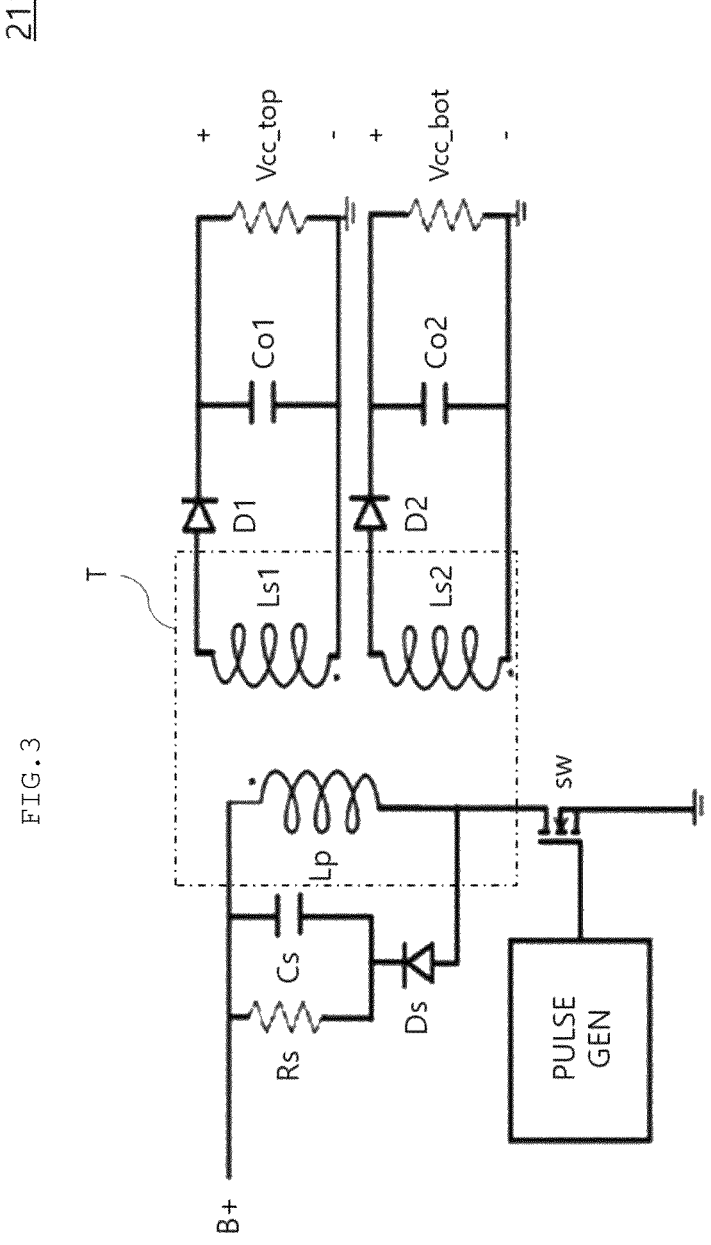
FIG. 3 is a circuit diagram showing a configuration of a power supply circuit according to an exemplary embodiment of the present disclosure.

FIG. 3 is a circuit diagram showing a configuration of a power supply circuit according to an exemplary embodiment of the present disclosure.

As shown in FIG. 3, the power supply circuit 211 includes an input terminal to which the power source voltage B+ is applied, a first output terminal through which the first driving power voltage Vcc_top is output, and a second output terminal through which the second driving power voltage Vcc_bot is output, and the input terminal, the first output terminal, and the second output terminal may be electrically insulated through a transformer. Here, the transformer T may include a primary coil Lp connected to the input terminal, a first secondary coil Ls1 connected to the first output terminal, and a second secondary coil Ls2 connected to the second output terminal.

The power supply circuit 211 according to the exemplary embodiment may be implemented as a flyback converter. The power supply circuit 211 may adjust the voltages of the first and second output terminals based on the winding ratio of the transformer T and the duty ratio of a switch sw controlled by a pulse generator PULSE GEN. A resistor Rs, a capacitor Cs, and a diode Ds may be connected to the primary coil Lp, a diode D1 and a capacitor Co1 may be connected to the first secondary coil Ls1, and a diode D2 and a capacitor Co2 may be connected to the second secondary coil Ls2.

Figure 4:
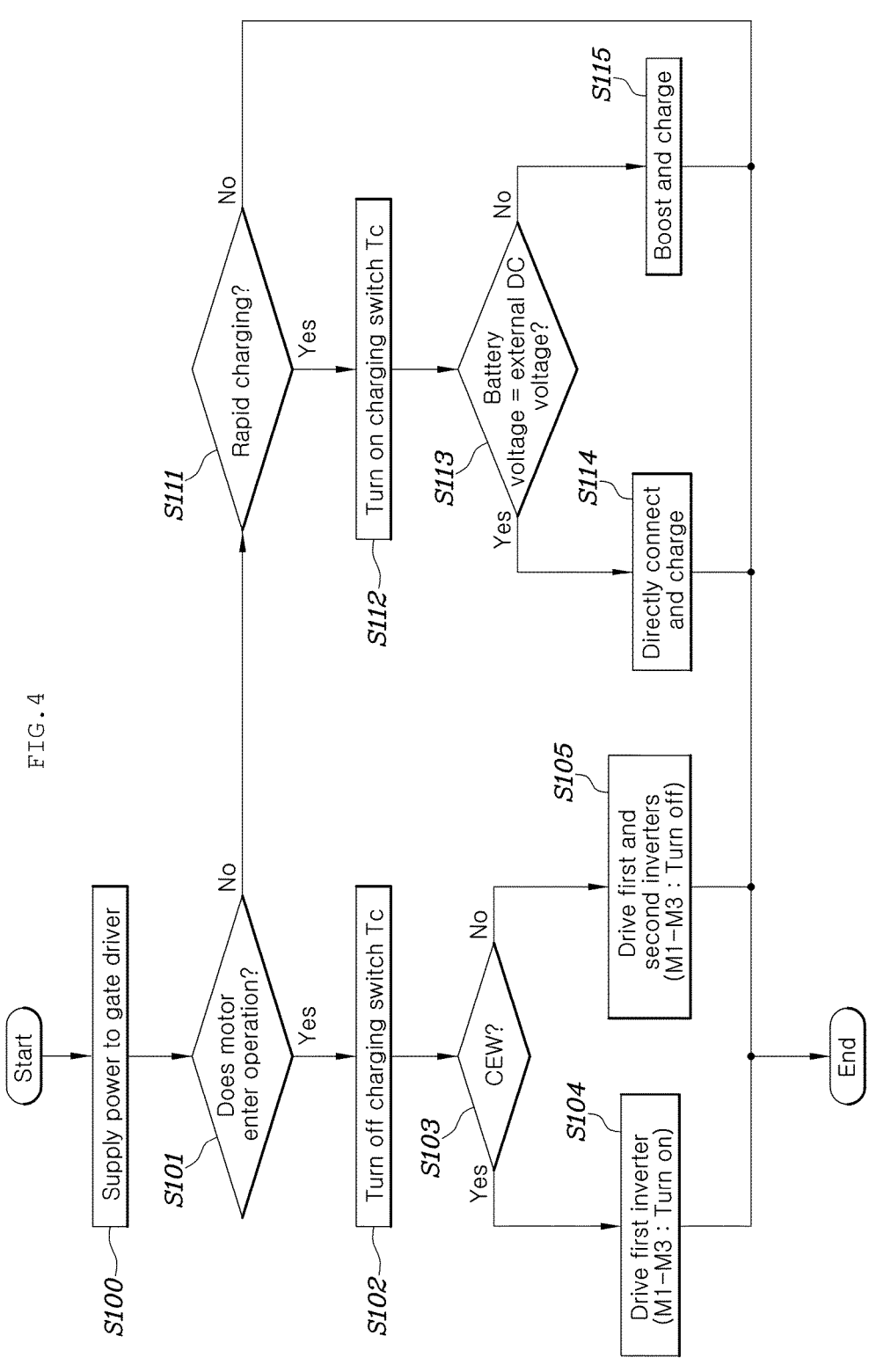
FIG. 4 is a flowchart for describing a method of controlling an electrified vehicle according to an exemplary embodiment of the present disclosure.

FIG. 4 is a flowchart for describing a method of controlling an electrified vehicle according to an exemplary embodiment of the present disclosure.

Referring to FIG. 4, in the gate driving device 200, the plurality of power supply circuits 211, 212, 213, 214, 215 and 216 may boost the power source voltage B+ and output the first driving power voltage and the second driving power voltage to the plurality of first gate drivers 221, 222 and 223 and the plurality of second gate drivers 231, 232 and 233 (S100).

The motor controller 100 may be configured to determine whether or not the motor 21 enters operation (S101).

When the motor 21 enters operation (YES in S101), the motor controller 100 may turn off the charging switch element Tc through one of the plurality of first and second gate drivers 221, 222 and 223 and 231, 232 and 233 to electrically separate the input capacitor Cin from the neutral terminal N (S102).

Thereafter, the motor controller 100 may be configured to determine setting of a motor driving mode (S103) and drive the motor 21 through at least one of the first and second inverters 22 and 23 according to setting of the motor driving mode (S104 and S105).

When the motor driving mode is set to the CEW mode (YES in S103), the motor controller 100 may turn on the plurality of transfer switch elements M1 to M3 so that the plurality of windings L1, L2, and L3 included in the motor 21 forms a neutral point, switch the plurality of legs S1-S2, S3-S4, and S5-S6 included in the first inverter 22, and control the plurality of switch elements S'1 to S'6 included in the second inverter 23 to be in a non-conductive state (S104). At the instant time, the plurality of first gate drivers 221, 222 and 223 may output a top control signal for switching the top switch elements S1, S3, and S5 of the first inverter 22 based on the first driving power voltage and output a bottom control signal for switching the bottom switch elements S2, S4, and S6 of the first inverter 22 based on the second driving power voltage.

When the motor driving mode is set to the OEW mode (NO in S103), the motor controller 100 may turn off the plurality of transfer switch elements M1 to M3 so that the plurality of windings L1, L2, and L3 included in the motor 21 do not form a neutral point, and switch the plurality of legs S1-S2, S3-S4, and S5-S6 included in the first inverter 22 and the plurality of legs S'1-S'2, S'3-S'4, and S'5-S'6 included in the second inverter 23 (S105). At the instant time, the plurality of first gate drivers 221, 222 and 223 may output a top control signal for switching the top switch elements S1, S3, and S5 of the first inverter 22 based on the first driving power voltage and output a bottom control signal for switching the bottom switch elements S2, S4, and S6 of the first inverter 22 based on the second driving power voltage. Furthermore, the plurality of second gate drivers 231, 232 and 233 may output a top control signal for switching the top switch devices S'1, S'3, and S'5 of the second inverter 23 based on the first driving power voltage and output a bottom control signal for switching the bottom switch elements S'2, S'4, and S'6 of the second inverter 23 based on the second driving power voltage.

If the motor does not enter operation (NO in S101), the motor controller 100 may be configured to determine whether to start rapid charging of the battery 10 (S111).

If the motor controller 100 starts rapid charging of the battery 10 (YES in S111), the motor controller 100 may turn on the charging switch element Tc through one of the plurality of first and second gate drivers 221, 222 and 223 and 231, 232 and 233 to electrically connect the input capacitor Cin to the neutral terminal N. At the instant time, one of the plurality of gate drivers 221, 222 and 223 and 231, 232 and 233 may activate a charging control signal applied to the charging switch element Tc based on the second driving power voltage to turn on the charging switch element Tc. At the instant time, the first charging relay RLY1 and the second charging relay RLY2 may be turned on.

Accordingly, it may be determined whether the level of the external DC voltage 40 is the same as the voltage level of the battery 10 (S113).

When the level of the external DC voltage 40 is the same as the voltage level of the battery 10 (YES in S113), the motor controller 100 may directly connect the external DC voltage 40 to the battery 10 to charge the battery 10 (S114). At the instant time, the motor controller 100 may turn on the plurality of transfer switch elements M1 to M3 through the gate driving device 200 and turn on the top switch element S'1, S'3, and S'5 included in the second inverter 23.

When the level of the external DC voltage 40 is lower than the voltage level of the battery 10 (NO in S113), the motor controller 100 may boost the external DC voltage 40 through the first inverter 22 and charge the battery 10 (S115). At the instant time, the motor controller 100 may turn on the plurality of transfer switch elements M1 to M3 through the gate driving device 200 and turn on the top switch elements S1, S3, and S5 and the bottom switch devices S2, S4, and S6 in a complementary manner.

As described above, according to an exemplary embodiment of the present disclosure, it is possible to reduce the area and the number of elements required for a gate driving device and improve design flexibility of the gate driving device by sharing a power supply circuit of the gate driving device for switch elements including the same gate potential in a motor driving device.

The effects which may be obtained in an exemplary embodiment of the present disclosure are not limited to the above-mentioned effects, and other effects which are not mentioned may be clearly understood by those of ordinary skill in the art to which the present disclosure belongs from the description below.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A gate driving apparatus comprising:
   a power supply circuit configured to boost a power source voltage and to output a first driving power voltage and a second driving power voltage; and
   a gate driver configured to drive a top control signal for switching a top switch element of an inverter by receiving the first driving power voltage from the power supply circuit, to drive a bottom control signal for switching a bottom switch element of the inverter by receiving the second driving power voltage from the power supply circuit, and to drive a charging control signal for switching a charging switch element connected between a neutral terminal of a motor and one end of the bottom switch element by receiving the second driving power voltage.

2. The gate driving apparatus of claim 1, wherein the power supply circuit includes:
   an input terminal to which the power source voltage is applied;
   a first output terminal through which the first driving power voltage is output;
   a second output terminal through which the second driving power voltage is output; and
   a transformer including a primary coil to which the input terminal is connected, a first secondary coil to which the first output terminal is connected, and a second secondary coil to which the second output terminal is connected.

3. The gate driving apparatus of claim 1,
   wherein the gate driving apparatus is electrically connected to gate terminals of the top switch element, the bottom switch element, and the charging switch element,
   wherein the top switch element is connected between a positive terminal of a battery and one end of the motor,
   wherein the bottom switch element is connected between a negative terminal of the battery and one end of the motor, and
   wherein the charging switch element is connected between the negative terminal of the battery and the neutral terminal.

4. The gate driving apparatus of claim 3, wherein the gate driver complementarily activates the top control signal and the bottom control signal based on a required power for the motor when the motor is driven.

5. The gate driving apparatus of claim 3, wherein the gate driver deactivates the charging control signal when the motor is driven and activates the charging control signal when the battery is charged.

6. A gate driving apparatus comprising:

a plurality of power supply circuits boosting a power source voltage and outputting each of a first driving power voltage and a second driving power voltage; and a plurality of gate drivers configured to receive the first driving power voltage and the second driving power voltage from the plurality of power supply circuits, corresponding to each of the power supply circuits, to drive a top control signal for switching one of a plurality of top switch elements included in an inverter based on the first driving power voltage, and to drive a bottom control signal for switching one of a plurality of bottom switch elements included in the inverter based on the second driving power voltage, wherein at least one of the plurality of gate drivers drives a charging control signal for switching a charging switch element connected to a neutral terminal of a motor and one end of the plurality of bottom switch elements by receiving the second driving power voltage.

7. The gate driving apparatus of claim 6, wherein each of the power supply circuits includes:

an input terminal to which the power source voltage is applied;

a first output terminal through which the first driving power voltage is output;

a second output terminal through which the second driving power voltage is output; and a transformer including a primary coil to which the input terminal is connected, a first secondary coil to which the first output terminal is connected, and a second secondary coil to which the second output terminal is connected.

8. The gate driving apparatus of claim 6, wherein the gate driving apparatus is electrically connected to gate terminals of the plurality of top switch elements, the plurality of bottom switch elements, and the charging switch element, wherein each of the top switch elements is connected to a positive terminal of a battery and different winding among a plurality of windings included in the motor, wherein each of the bottom switch elements is connected to a negative terminal of the battery and different winding among the plurality of windings, and wherein the charging switch element is connected between the negative terminal of the battery and the neutral terminal.

9. The gate driving apparatus of claim 8, wherein each of the gate drivers complementarily activates the top control signal and the bottom control signal based on a required power for the motor when the motor is driven.

10. The gate driving apparatus of claim 8, wherein at least one of the plurality of gate drivers deactivates the charging control signal when the motor is driven and activates the charging control signal when the battery is charged.

11. The gate driving apparatus of claim 6, wherein at least one of the plurality of gate drivers outputs a mode switching control signal for switching a transfer switch element connected to the neutral terminal and one end of at least one of the plurality of top switch elements based on the first driving power voltage.

12. A method of controlling an electrified vehicle, the method comprising:

boosting, by a power supply circuit, a power source voltage and outputting a first driving power voltage and a second driving power voltage to a gate driver;

driving, by the gate driver, a motor by switching a top switch element of an inverter based on the first driving power voltage and switching a bottom switch element of the inverter based on the second driving power voltage; and turning on, by the gate driver, a charging switch element connected between a neutral terminal of the motor and one end of the bottom switch element to charge a battery based on the second driving power voltage.

13. The method of claim 12, further including turning off the charging switch element by the gate driver at a time of entering operation of the motor.

14. The method of claim 13, including turning on the charging switch element by the gate driver when the motor does not enter operation thereof and rapid charging of the battery is started.

15. The method of claim 14, including directly connecting an external DC voltage to the battery to charge the battery when a level of the external DC voltage is equal to a voltage level of the battery.

16. The method of claim 14, including boosting an external DC voltage through the inverter and charge the battery, when a level of the external DC voltage is lower than a voltage level of a battery.

* * * * *